United States Patent Office 2,717,981
Patented Sept. 13, 1955

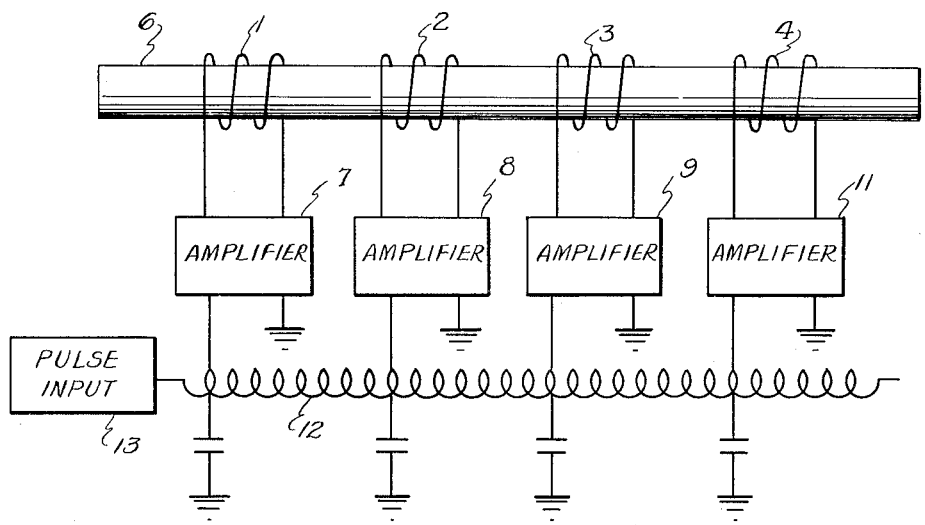

2,717,981

MAGNETOSTRICTION TRAVELING-WAVE TRANSDUCERS

Maurice Apstein, Bethesda, Md., assignor to the United States of America as represented by the Secretary of Commerce Application July 9, 1952, Serial No. 298,014

5 Claims. (Cl. 318—118)

(Granted under Title 35, U. S. Code (1952), sec. 266)

The invention described herein may be manufactured and used by or for the Government of the United States for governmental purposes without the payment to me of any royalty thereon in accordance with the provisions of the act of March 3, 1883, as amended (45 Stat. 467; 35 U. S. C. 45).

The present invention relates to the art of setting up vibrations and vibratory waves in bodies, and in particular to the art of setting up vibrations in magnetostrictive bodies in which the body can be used to vibrate over a wide range of frequencies. This invention is an improvement on the invention disclosed in application Serial Number 290,841, filed May 29, 1952, by Jacob Rabinow.

In the prior art of magnetostrictive vibratory transducers large amplitudes of oscillation were obtained by using the phenomena of resonance. This means that the amplitudes were built up by a succession of shocks in phase with the natural frequency of the system. This system of setting up large amplitudes of vibration is inapplicable to cases where it is necessary to have a wideband vibrator. This limitation is particularly undesirable in the field of material testing where it is desirable to subject the material under test to wide ranges of vibrational frequencies.

It is the primary object of this invention to provide a system for producing stresses in magnetostrictive bodies in which the frequency of vibration is not limited to the natural frequency of the vibrating body.

Another object of this invention is to provide for vibrating bodies in which the wave shape of the vibrations may be controlled.

Another object of the invention is to provide a system for vibrating magnetostrictive bodies in which the body may be caused to vibrate over a wide range of frequencies.

In accordance with the present invention a number of electric coils are positioned around a magnetostrictive body at spaced intervals along the length of the body. Each coil is connected in the output of an electronic amplifier and receives its power therefrom. The inputs to the amplifiers are connected at spaced intervals along an electrical delay line and are excited sequentially by means of a pulse traveling along this line. The pulse sent out by a signal source energizes the first amplifier which in turn energizes the first coil. The mechanical disturbance created in the body as a result of the energization of the coil travels in both directions along the body. The electrical impulse traveling along the electrical delay line is timed so that the second amplifier and therefore the second coil is energized at such a time that the disturbance created by the second coil is added to the disturbance set up in the body by the first coil; that is, the delay in the delay line between the amplifiers must be such that the electrical pulse traveling along the delay line from the first to the second amplifier reaches the second amplifier at such a time that the second coil stresses the body just when the stress produced by the first coil has reached that part of the body affected by the second coil. The number of coils employed depends upon the amplitude of the vibration desired. As many as ten coils have been utilized in the present invention without reaching the saturation point of the rod.

Other uses and advantages of the invention will become apparent upon reference to the specification and drawings.

The drawing shows a schematic diagram of the invention in which a series of coils are positioned at spaced intervals along a magnetostrictive rod.

Referring to the figure, a series of coils 1, 2, 3, and 4 are positioned at spaced intervals along a magnetostrictive bar 6 which may be constructed of any material having substantial magnetostrictive properties, for example, cold-rolled steel, nickel, or some of the magnetic ceramic materials. Each coil is connected in the output of an associated amplifier. In this case coil 1 is connected in the output of amplifier 7, coil 2 is connected in the output of amplifier 8, et cetera. The input of each amplifier is connected to the electrical delay line 12. The input to the delay line is from the pulse source 13.

The operation of the device is as follows: A pulse is fed simultaneously to the delay line 12 and the amplifier 7 from the source 13. This pulse is amplified by the amplifier 7 and fed to the coil 1. The magnetic field produced by the coil 1 acts upon the magnetostrictive material of rod 6 and produces a longitudinal mechanical disturbance in the rod 6 which travels in both directions from the coil. The time delay in the electrical delay line 12 between the inputs of amplifiers 7 and 8 has been so chosen that by the time the disturbance created in the bar by coil 1 has reached the coil 2, the coil 2 is energized and also creates a disturbance in the bar which is added to the vibration created by the coil 1 and therefore intensifies the overall vibration in the bar. This action continues until the coil 4 is reached, each coil adding its disturbance to the total of the vibrations created by the preceding coils. The vibrations then proceed to the right-hand end of the bar where the energy is made use of by an energy-absorbing device, not shown. It will be noted that the proper additive relationship between the disturbances created by the various coils will be maintained only for those vibrations traveling in the same direction as the controlling signal in the delay line. The pulses from each stage which travel in the opposite direction serve no useful purpose and must ultimately be disposed of. This can be accomplished by putting suitable termination means on the left-hand end of the rod. However, these are not shown in the figure since they are well known in the art.

It can be seen from the above that the frequency of vibration of the bar 15 is independent of its length, it being possible to transmit a large number of disturbances of short wavelength along the bar without the disturbances interfering with each other. The only timing problem involved is concerned with the necessity that each coil add its disturbance when the sum of previously produced vibrations reaches the place in the rod affected by the coil in question. The wave shape of the disturbance set up in the rod is controllable, it being possible to vary the shape in accordance with the particular application for which the transducer is to be used.

It should be noted that since the electrical input and resulting losses in the coils and in the magnetostrictive bar occur throughout the entire length of the body, the resulting heat generated in the system is distributed over a large area and therefore the problem of heat dissipation is greatly minimized.

It will be apparent that the embodiments shown are only exemplary and that various modifications can be made in construction and arrangement within the scope of my invention as defined in the appended claims.

I claim:

1. A device for the generation of mechanical disturbances comprising an elongated magnetostrictive body in which disturbances are to be induced, a plurality of means for subjecting said magnetostrictive body to a plurality of magnetic fields, said means arranged at spaced intervals along the path of propagation of said mechanical disturbances in said body, means for energizing one of said first-named means to initiate a mechanical disturbance in said body and means for energizing others of said first-named means at such times as to reinforce said mechanical disturbance as it is passing said other first-named means.

2. A device for the generation of traveling waves in a magnetostrictive body, comprising an elongated magnetostrictive body in which the traveling waves are to be induced, a plurality of electric coils for subjecting said magnetostrictive body to a plurality of magnetic fields said electric coils arranged at intervals along one dimension of the body, a plurality of exciting means, one of said means connected to each of said electric coils for energizing the coils, means for energizing one of said exciting means to initiate a mechanical disturbance in said body and means for energizing others of said exciting means at such times as to reinforce said mechanical disturbance as it is passing said electric coils.

3. A device for the generation of traveling waves in a magnetostrictive body, comprising an elongated magnetostrictive body in which traveling waves are to be induced, exciting means arranged at intervals along one dimension of said body for inducing mechanical disturbances in said body, a plurality of amplifier means, one of said amplifier means connected to each of said exciting means for energizing said exciting means, and a section of delay line connected between each of said amplifier means, the time delay in each of said sections of delay line being equal to the time of travel of said mechanical disturbances between the exciting means with which each of said sections of delay line is associated.

4. A device for the production of traveling waves, comprising an elongated magnetostrictive body in which traveling waves are to be induced, electric coils spaced along one dimension of said body for inducing mechanical disturbances in said magnetostrictive body, an amplifier connected to each of said electric coils for energizing said coils, a delay line connected between the inputs to each of said amplifiers, the propagation velocity of said delay line being such that the mechanical disturbances induced by each of said electric coils reinforce said traveling waves as they are passing each of said electric coils.

5. A device for the generation of traveling waves in a magnetostrictive body, comprising an elongated magnetostrictive body in which traveling waves are to be induced, electric coils arranged at intervals along the length of said body for inducing mechanical disturbances in said body, an amplifier connected to each of the electric coils, each electric coil being connected in the output of its associated amplifier, and an electrical delay line connected between the inputs of each of said amplifiers, the propagation velocity of said delay line being matched to the propagation velocity of the mechanical disturbances between the electric coils with which the delay line is associated.

References Cited in the file of this patent

UNITED STATES PATENTS

| Number | Name | Date |
|---|---|---|
| 438,870 | Todd | Oct. 21, 1890 |
| 1,629,100 | Hartley | May 17, 1927 |
| 2,190,666 | Kallmeyer | Feb. 20, 1940 |
| 2,462,533 | Moynihan | Feb. 22, 1949 |
| 2,506,141 | Drouin | May 2, 1950 |
| 2,571,019 | Donley et al. | Oct. 9, 1951 |